Sept. 16, 1941.     F. M. REID     2,256,037
VEHICLE FLOOR STRUCTURE
Filed March 6, 1941
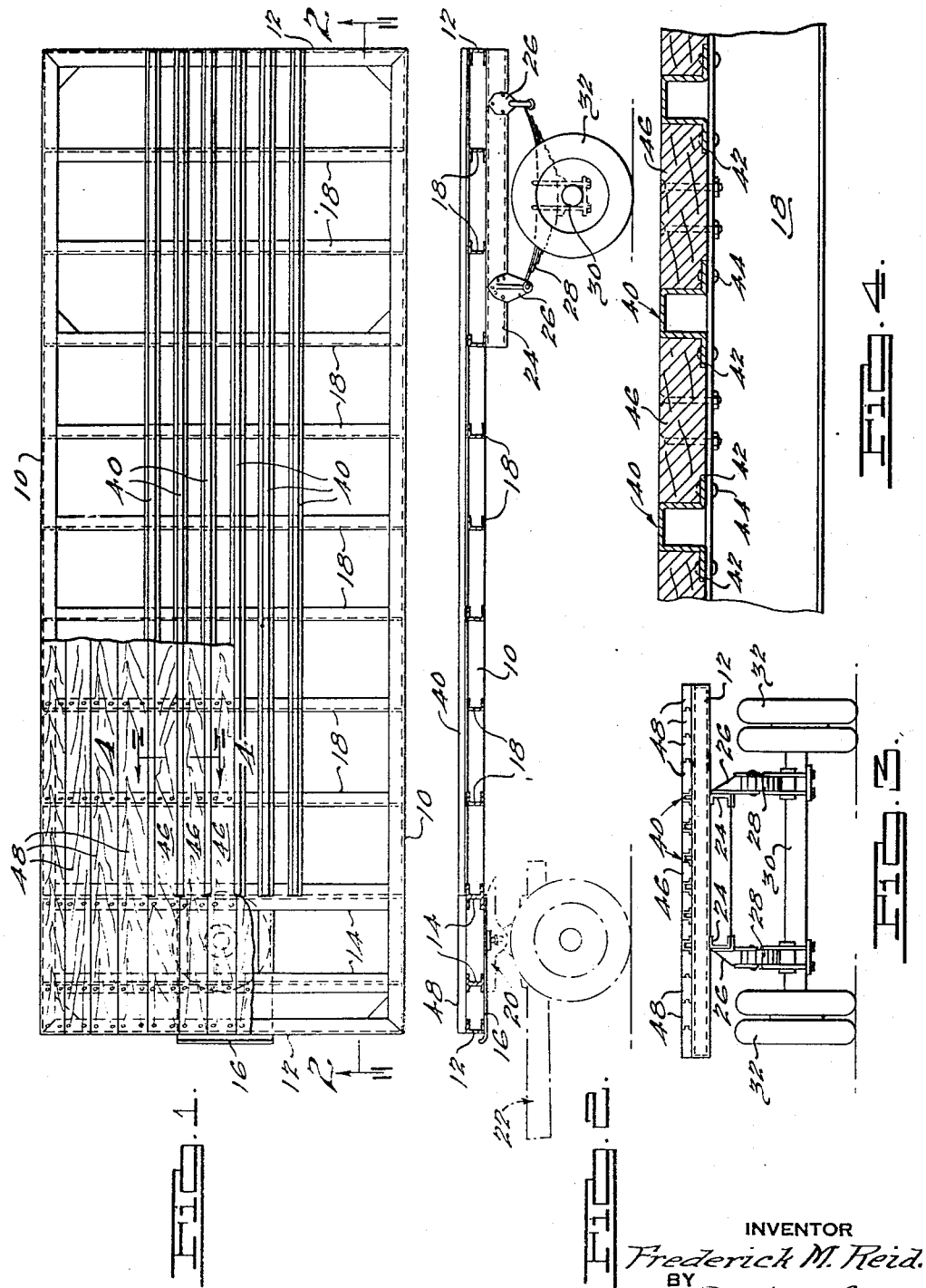
INVENTOR
Frederick M. Reid.
BY
Harness, Dickey & Pierce.
ATTORNEYS.

Patented Sept. 16, 1941

2,256,037

UNITED STATES PATENT OFFICE 2,256,037

VEHICLE FLOOR STRUCTURE

Frederick M. Reid, Detroit, Mich., assignor to Fruehauf Trailer Company, Detroit, Mich., a corporation of Michigan Application March 6, 1941, Serial No. 381,993

4 Claims. (Cl. 296—28)

This invention relates to vehicles and particularly to vehicles of the commercial type and has special reference to floor structures therefor, the principal object being the provision of a combined frame and floor structure for commercial vehicles that will be amply strong, relatively light and will withstand the wear it is subjected to an improved extent.

Objects of the invention include the provision of a combined frame and floor structure for a commercial vehicle in which strips of wooden flooring are separated by metallic members serving as major stress transmitting means of the frame; the provision of a combined frame and floor structure for a vehicle in which sheet metal members of angular section forming part of the frame structure are extended longitudinally of the floor in transversely spaced relation with respect to each other and wooden flooring elements fill the space between such sheet metal members, whereby the sheet metal members serve both as portions of the floor surface and as stress transmitting elements of the frame; the provision of a construction as above described in which the sheet metal members are provided with outwardly extending marginal flanges at their lower edges serving in part to support the wooden floor members thereon; the provision of a floor structure for a vehicle comprising spaced metal members and alternate wooden flooring members co-acting to form the floor surfaces and cooperating between them to provide a water-tight structure despite shrinkage of the wood members in service; and the provision of a floor structure of the type described for commercial vehicles and in which the metal members serve to protect the surface of the wooden members against undue wear and tear from sliding or rolling heavy articles over the same.

Further objects of the invention include the provision of a combined frame and floor structure for semi-trailers; the provision of an improved floor and frame structure for semi-trailers including metal members extending longitudinally of the frame and providing direct draft connections between the fifth wheel supporting members and the rear wheel supporting members; the provision of a combined frame and floor structure for a semi-trailer including a metal frame comprising longitudinally extending side rails and a plurality of cross-members interconnected between them, a fifth wheel member being fixed to at least one of said cross-members at one end of said frame and a plurality of load supporting members being fixed to two or more of said cross-members intermediate said side members adjacent the rear end of the frame, a plurality of sheet metal members extending longitudinally of the frame on the upper surface thereof and being directly connected to those cross-members to which said fifth wheel member is connected and directly to those cross-members to which said load supporting means are connected thereby to provide direct draft connections between such cross-members, together with wooden floor elements covering the upper surface of the frame between said longitudinally extending members; and the provision of a combined floor and frame structure for a semi-trailer including longitudinally extending draft connections between opposite ends of the trailer and interposed wooden flooring elements, the longitudinally extending members cooperating with the flooring elements to provide a floor surface.

The above being among the objects of the present invention the same consists in certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Fig. 1 is a plan view of a semi-trailer embodying a combined frame and floor structure constructed in accordance with the present invention;

Fig. 2 is a vertical sectional view taken longitudinally of the trailer shown in Fig. 1 as on the line 2—2 thereof;

Fig. 3 is a rear elevational view of the trailer shown in the preceding views; and, Fig. 4 is an enlarged fragmentary, transverse, vertical sectional view taken on the line 4—4 of Fig. 1, illustrating the construction of the floor structure in further detail.

The present invention relates to vehicles wherein the frame and floor constitute a single unit and is particularly adaptable for use in connection with commercial vehicles. Vehicles of the above described type are desirable for the reason that they eliminate the need of separately forming a chassis frame and a body floor and thereafter assembling the same together, as was formerly done and as is now generally done in pleasure vehicles, and thereby results in a structure that is more economical to build and sell than the separately formed types of structures.

In vehicles of the types to which the present invention is applicable a frame is constructed of a width equal to that desired in the floor of the completed vehicle, this regardless of whether the vehicle is to be of the platform, stake, van or other body type, and strips of wooden flooring are applied and secured directly to the upper surface of such frame. This form of construction requires a much wider frame than the chassis frame of the former types of construction and unless made of unduly heavy construction introduces many problems all of which have not been overcome in a satisfactory manner heretofore. For instance, with such wider frames, which also directly serve as the load carrying members of both body, floor and the frames of the older types of construction, the draft or pull between the opposite ends of the vehicle has been transferred substantially entirely to the side members and certain interconnected cross-members, the latter of which being of relatively great width have had a tendency to yield under load and set up undesirable stresses in themselves and other parts.

Additionally, the use of all wooden floors has resulted in early destruction of the floor surface where the vehicle is employed for handling heavy objects which are conventionally slid along the floor in loading and unloading of the same, requiring frequent replacement of the floors with attendant cost and tie-up of the vehicle during such replacements.

The present invention provide a floor structure of the type described in which metallic members are provided on the frame and particularly over the central portion thereof serving to tie opposite ends of the frame together and thereby to take a major portion of the pull or draft between the opposite ends of the vehicle. Additionally, these members are formed to provide a portion of the actual floor surface of the vehicle, wooden members being interposed therebetween and between the outer ones thereof and the outside of the frame to complete the floor structure. By this means the metal members serve to take the bulk of the wear and tear on the floor surface due to sliding heavy objects over the same and thus protect the wooden floor members from excessive damage, thereby increasing the life of the wooden floor members and lessening the frequency of renewal of the same. At the same time the metal members are so shaped and so cooperate with the wooden members as to eliminate to a great extent at least opening up between the members due to shrinkage of the wood, thereby maintaining the water-tight construction of the floor despite shrinkage of the wooden members.

It will be appreciated that while the present invention is adaptable for use as a combined frame and floor structure for any vehicle of the type described, it is particularly adaptable for use in commercial vehicles of the semi-trailer type inasmuch as in such application it has unusual advantages. Accordingly, the present invention is illustrated in the drawing as being applied to a semi-trailer type of vehicle.

It will also be appreciated that the present invention may be employed in a vehicle regardless of the type of body employed in conjunction therewith. In other words it may be employed with a simple platform type of vehicle, stake body type, closed body type such as vans or the like, or with any other desired type of body structure. For the purpose of simplicity it is shown in the drawing as applied to a simple platform type of vehicle.

Referring now to the accompanying drawing, a vehicle of the semi-trailer type is illustrated. It includes a frame having channel-sectioned side members 10 and channel-sectioned end members 12 rigidly secured thereto as by riveting, welding or the like and all arranged with the channels thereof opening horizontally inwardly. Interposed between the side members 10 between the end members 12 are a plurality of cross-members arranged perpendicularly with respect to the side members 10 and spaced from one another longitudinally of the vehicle. In the particular construction shown the first two cross-members 14 at the forward end of the vehicle are of I-beam construction for the purpose of transfering the load from the trailer fifth wheel member 16 secured to the lower faces thereof, to the side members 10. The remaining cross-members 18 are of conventional channel section. The fifth wheel member 16 may be of conventional construction adapted to be received and locked to a conventional tractor-fifth wheel mechanism indicated in Fig. 2 generally at 20 and which may be supported upon the rear end of a conventional tractor indicated generally at 22 in any conventional or suitable manner.

At the rear end of the structure and as best illustrated in Figs. 2 and 3 a pair of longitudinally extending channel load carrying members 24 are secured to the bottom faces of some of the rear cross-members 18 and the rear cross-members 12 and rigidly fixed thereto, the members 24 in the case shown extending forwardly as far as the third cross-member 18 as indicated in Fig. 2. Spring hangers 26 are fixed to each of the members 24 in longitudinally spaced relation with respect to each other and mounted between them is a conventional leaf spring 28 fixed to the usual rear axle 30 which carries conventional wheels 32.

The construction thus far described is conventional and it will be appreciated that with such construction when a pull is applied to the fifth wheel 16 such pull must be transmitted transversely outwardly through the members 14 to the frame side members 10, then rearwardly and through the cross-members 18 to the load carrying members 24 before being applied to the wheels 32. It will be appreciated that such load thus has a tendency to apply bending stresses to the members 14 and 18. Furthermore in conventional constructions the upper surface of the frame thus described is simply covered with suitable wooden flooring elements to provide the desired imperforate flooring. Preferably and usually such flooring elements are of the dovetailed type having interfitting tongues and grooves. The tongues and grooves are desirable for the purpose of making the floor water-tight but do offer difficulties where one or two strips of such flooring require replacement because of wear, damage or the like.

In accordance with the present invention in order to relieve the members 14 and 18 of the stresses to which they are subjected in conventional constructions due to a pull being applied to the fifth wheel member 16, a plurality of metallic members indicated generally in Fig. 1 at 40 are applied to the upper surfaces of the cross-members 18 and to at least one of the cross-members 14 and are rigidly fixed thereto by welding, riveting or the like. The members 40 are arranged in transversely spaced relation as illustrated and project upwardly a distance corresponding to the thickness of the floor boards employed for completing the covering of the floor so that their upper surfaces thus provide a portion of such floor surface.

Preferably the members 40 are formed from sheet metal to the cross-sectional configuration best brought out in Fig. 4 and which, as indicated, is of an inverted channel-shaped section having outwardly extending flanges 42 at the free edges thereof which rest upon the upper surfaces of the cross-members 14 and/or 18 and are fixed thereto as by means of rivets 44.

It will be appreciated that the number of members 40 employed in any particular construction may be varied to suit the desires of the individual designer, six being shown in the construction illustrated and as applied substantially entirely to the central portion of the floor, this being deemed sufficient in view of the fact that by their arrangement they extend over the width between the load supporting members 24 and are in the central portion of the floor where the greatest wear in service occurs. In the particular construction shown the members 40 are sufficiently close together transversely of the structure so that a single wooden flooring element such as 46 may completely fill the space between each adjacent pair of members. With this arrangement it will be appreciated that the overlapped relation of the opposite edges of each strip 46 with respect to the flanges 42 of the cooperating members 40 forms a water-proof and dust-proof joint that will not be adversely affected in this respect through shrinkage of the wooden members. Furthermore, the flanges 42 serve to support the edges of the wooden members 46 and this fact, coupled with the added strength imparted to the floor by the metal members 40, permits a floor of less thickness than conventional constructions to be employed. As particularly brought out in Fig. 3 outwardly of the outermost members 40 wooden flooring members 48 of conventional construction are provided extending to the outer edges of the side members 10 of the frame structure. The members 40 are, of course, substantially of the same vertical dimensions as the thickness of the wooden flooring members 46 and 48 so that the flat upper surfaces thereof form a part of the actual floor surface for the vehicle. Thus any objects that are slid along the floor structure will bear directly against the upper surfaces of the members 40 which, being of metal and not readily subjected to wear or damage, act to protect the surface of the wooden members 46 between them against excessive wear or damage. It will also be appreciated that when articles are trucked into the vehicle the trucks will usually be moved along the central portion of the floor structure in which event the metal members 40 will also serve to take the brunt of the wear from the trucks.

It will be appreciated from the foregoing that the members 40 in directly connecting at least one of the cross-members 14 with those cross-members 18 at the rear end of the vehicle and to which the load supporting members 24 are directly connected, serve as a direct draft connection between these cross-members and thus the need of the side members 10 to further serve as draft members between the opposite ends of the vehicle is largely eliminated, as well as any undue stresses which would be set up in them because of such functioning. The rearmost of the front cross-members 14 being of I-beam construction and relatively heavy and in being directly connected to both the fifth wheel member 16 and to the members 40, is amply capable of transmitting through it the draft between the two ends of the vehicle without undue stress, and a corresponding condition results in those cross-members 18 which are common to both the members 40 and the load carrying member 24. Thus it will be appreciated that by the use of the present invention not only are the members of the structure relieved to a major extent of undesirable stresses set up therein due to draft loads between opposite ends of the structure, but the additional members which are provided to obtain this result have the further function of serving as a portion of the floor surface and as a means for protecting the floor surface against undue and unusual wear.

Having thus described my invention, what I claim is:

1. In a vehicle frame and floor structure, in combination, a pair of transversely spaced longitudinally extending metallic side members, a plurality of longitudinally spaced metallic cross-members interconnecting said side members and rigidly secured thereto substantially in the plane of said side members to provide a frame substantially devoid of major draft transmitting elements extending longitudinally thereof below the same, draft applying means secured to the lower face of at least one of said cross-members adjacent the forward end of said structure, wheel supporting means secured to the lower face at least two of said cross-members adjacent the rear end of said structure, a plurality of angularly sectioned metallic members arranged longitudinally of said structure over the central portion thereof in transversely spaced relation with respect to each other and overlying said cross-members and connecting the first mentioned of said cross-members with the last mentioned of said cross-members, and wooden flooring elements overlying said cross-members and cooperating with said angularly sectioned metal members to provide a complete floor surface for said structure.

2. In a vehicle frame and floor structure, in combination, a pair of transversely spaced longitudinally extending metallic side members, a plurality of longitudinally spaced metallic cross-members interconnecting said side members and rigidly secured thereto substantially in the plane of said side members to provide a frame substantially devoid of major draft transmitting elements extending longitudinally thereof below the same, draft applying means secured to the lower face of at least one of said cross-members adjacent the forward end of said structure, wheel supporting means secured to the lower face of at least two of said cross-members adjacent the rear end of said structure, a plurality of angularly sectioned metallic members arranged longitudinally of said structure over the central portion thereof in transversely spaced relation with respect to each other and overlying said cross-members and connecting the first mentioned of said cross-members with the last mentioned of said cross-members, and wooden flooring elements overlying said cross-members and cooperating with said angularly sectioned metal members to provide a complete floor surface for said structure, said longitudinally extending members being of inverted channel section and having outwardly extending flanges at the open side of the channel resting on and fixed to said cross-members.

3. In a semi-trailer and floor structure, in combination, a pair of transversely spaced longitudinally extending metallic side members, a plurality of metal cross-members extending between and fixed to said side members substantially in the plane thereof to provide a frame substantially devoid of major draft transmitting elements extending longitudinally thereof below the same, a fifth wheel structure fixed to the lower face of at least one of said cross-members adjacent the front end of said structure, a pair of transversely spaced longitudinally extending load supporting members underlying and fixed to at least two of said cross-members adjacent the rear end of said structure, a plurality of transversely spaced longitudinally extending angularly sectioned metal members overlying and extending between the first mentioned cross-member and the last mentioned cross-members and fixed thereto and to the intervening cross-members, and wooden floor boards overlying and secured to the upper faces of said cross-members and of substantially the same thickness as the vertical dimension of said angularly sectioned members and cooperating with the latter to form a complete floor structure.

4. In a semi-trailer frame and floor structure, in combination, a pair of transversely spaced longitudinally extending metallic side members, a plurality of metal cross-members extending between and fixed to said side members substantially in the plane thereof to provide a frame substantially devoid of major draft transmitting elements extending longitudinally thereof below the same, a fifth wheel structure fixed to the lower face of at least one of said cross-members adjacent the front end of said structure, a pair of transversely spaced longitudinally extending load supporting members underlying and fixed to at least two of said cross-members adjacent the rear end of said structure, a plurality of transversely spaced longitudinally extending angularly sectioned metal members overlying and extending between the first mentioned cross-member and the last mentioned cross-members and fixed thereto and to the intervening cross-members, and wooden floor boards overlying and secured to the upper faces of said cross-members and of substantially the same thickness as the vertical dimension of said angularly sectioned members and cooperating with the latter to form a complete floor structure, said longitudinally extending members being of inverted channel section with outwardly directed flanges at the open side of the channel, and the next adjacent of said floor boards bearing on said flanges.

FREDERICK M. REID.